(12) United States Patent
Jin et al.

(10) Patent No.: US 8,500,385 B2
(45) Date of Patent: Aug. 6, 2013

(54) ROBOTIC ARM

(75) Inventors: Jian-Ping Jin, Shenzhen (CN); Zhen-Gang Xie, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 357 days.

(21) Appl. No.: 12/913,947

(22) Filed: Oct. 28, 2010

(65) Prior Publication Data
US 2012/0034058 A1    Feb. 9, 2012

(30) Foreign Application Priority Data
Aug. 9, 2010  (CN) .......................... 2010 1 0248371

(51) Int. Cl.
*B66C 1/42*    (2006.01)
(52) U.S. Cl.
USPC ........ 414/590; 294/119.1; 294/902; 414/591; 414/749.1; 414/751.1; 901/31
(58) Field of Classification Search
USPC ............... 414/591, 749.1, 753.1, 590, 751.1, 414/744.1; 901/31; 294/119.1, 902
See application file for complete search history.

(56) References Cited

U.S. PATENT DOCUMENTS

| | | | | |
|---|---|---|---|---|
| 3,007,097 A | * | 10/1961 | Weiser et al. | 318/575 |
| 3,262,593 A | * | 7/1966 | Hainer | 414/619 |
| 3,888,362 A | * | 6/1975 | Fletcher et al. | 414/620 |
| 3,951,271 A | * | 4/1976 | Mette | 414/591 |
| 4,077,525 A | * | 3/1978 | Callegari et al. | 414/22.63 |
| 4,196,049 A | * | 4/1980 | Burns et al. | 376/249 |
| 4,229,136 A | * | 10/1980 | Panissidi | 414/673 |
| 4,599,037 A | * | 7/1986 | Ross et al. | 414/752.1 |
| 5,848,872 A | * | 12/1998 | Manes et al. | 414/753.1 |
| 6,010,536 A | * | 1/2000 | Veatch | 623/63 |
| 6,458,324 B1 | * | 10/2002 | Schinzel | 422/65 |
| 6,502,880 B1 | * | 1/2003 | Sawdon | 414/749.1 |
| 6,640,660 B2 | * | 11/2003 | Kasai | 74/50 |
| 2003/0035711 A1 | * | 2/2003 | Gilchrist | 414/744.5 |
| 2009/0067973 A1 | * | 3/2009 | Eliuk et al. | 414/729 |

* cited by examiner

*Primary Examiner* — Michael Scott Lowe
(74) *Attorney, Agent, or Firm* — Altis Law Group, Inc.

(57) ABSTRACT

A robotic arm is for holding a molding item. The robotic arm includes a mount; a lifting mechanism mounted to the mount; a horizontal driving device; a rotating assembly mounted between the lifting mechanism and the horizontal driving device to rotate the horizontal driving device relative to the lifting mechanism; a holder for holding the molding item, the holder mounted on the horizontal driving device. The lifting mechanism cause the holder to move relative to the mount in a first direction, the horizontal driving device moves the holder relative to the mount and the lifting mechanism in a second direction perpendicular to the first direction.

2 Claims, 3 Drawing Sheets

ROBOTIC ARM

CROSS-REFERENCE TO RELATED APPLICATIONS

This application is related to co-pending U.S. patent application Ser. No. 12/913,942, and application Ser. No. 12/913,934), entitled "ROBOTIC ARM", by Jin et al. These applications have the same assignee as the present application and have been concurrently filed herewith. The above-identified applications are incorporated herein by reference.

BACKGROUND

1. Technical Field

This disclosure relates to robotic arms, particularly to robotic arms for handling freshly molded items.

2. Description of Related Art

Molding machines typically use robotic arms to handle molded items. However, typical robotic arms have a complicated mechanism and are difficult to adjust.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary robotic arm. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
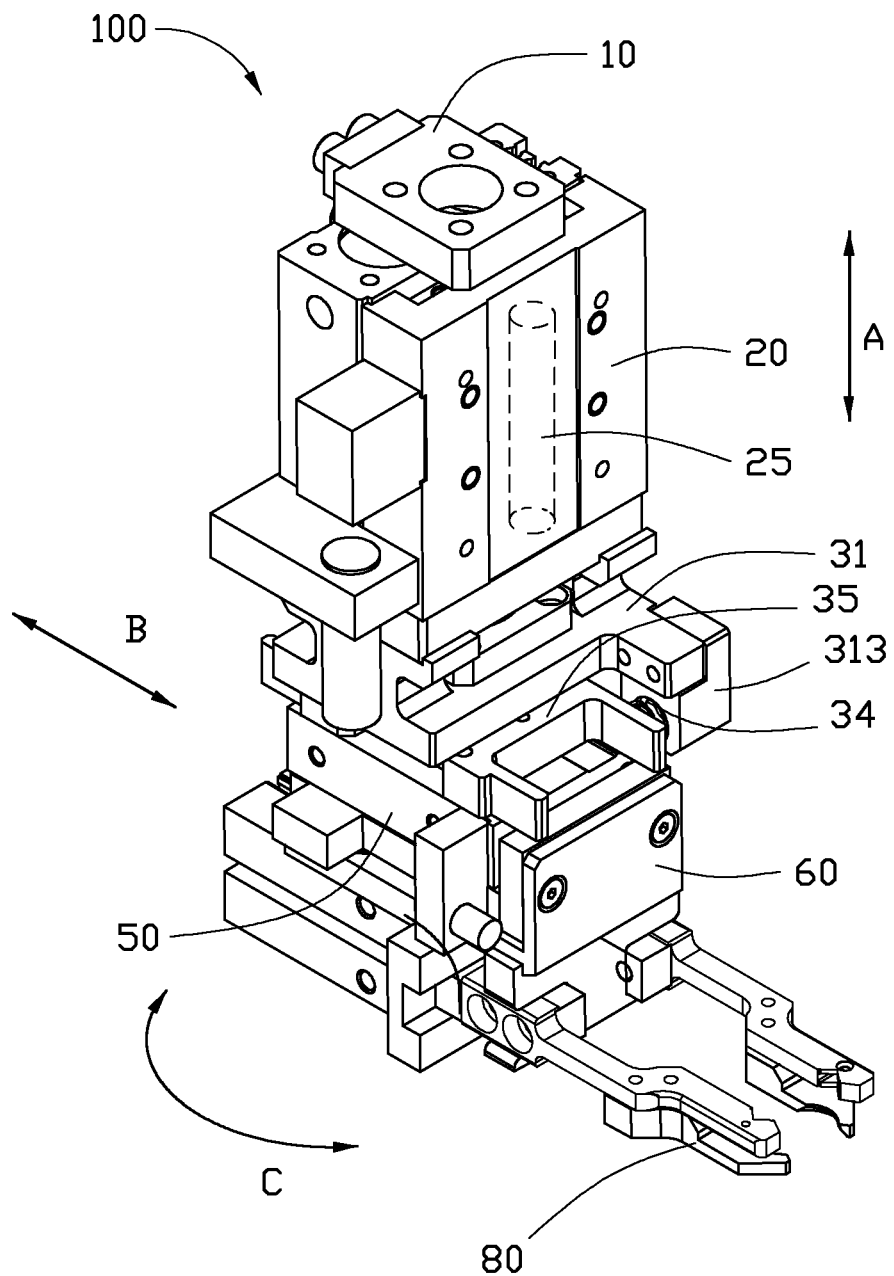
FIG. 1 is an assembled view of an exemplary embodiment of a robotic arm.
Figure 2:
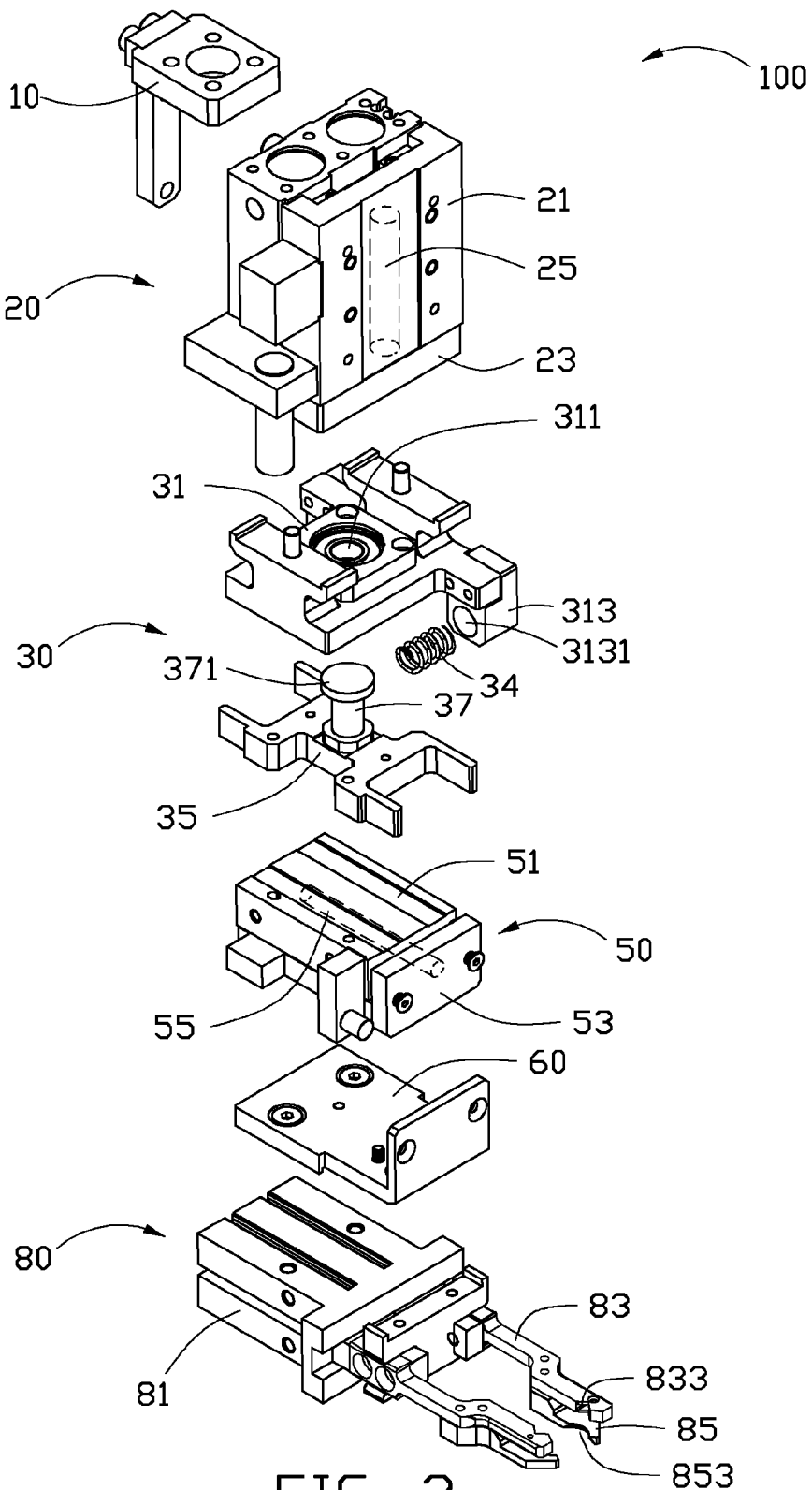
FIG. 2 is an exploded view of the robotic arm shown in FIG. 1.

Referring to FIGS. 1-2, an exemplary robotic arm 100 used with a molding machine (not shown) is disclosed. The robotic arm 100 can reach into the molding machine for holding and removing molded items (not shown).

The robotic arm 100 includes a mount 10, a lifting mechanism 20, a rotating assembly 30, a horizontal driving device 50, a connecting board 60, and a holder 80. The lifting mechanism 20 is mounted to the mount 10 and can control the holder 80 to move relative to the mount 10 in a first (e.g., vertical) direction A. The horizontal driving device 50 is connected to the holder 80 by the connecting board 60. The horizontal driving device 50 can control the holder 80 to move relative to the mount 10 and the lifting mechanism 20 in a second (e.g., horizontal) direction B perpendicular to the first direction A. The rotating assembly 30 is mounted between the lifting mechanism 20 and the horizontal driving device 50 to rotate the horizontal driving device 50 relative to the lifting mechanism 20 in a third direction C.

The lifting mechanism 20 includes a first cylinder assembly 21 mounted to the mount 10, a first output rod 25 movably mounted on the first cylinder assembly 21 and a first mounting board 23 mounted on a distal end of the first output rod 25. The first mounting board 23 is used for retaining the rotating assembly 30 to the lifting mechanism 20 so when the first mounting board 23 moves relative to the first cylinder assembly 21 along the first output rod 25, the first mounting board 23 drives the rotating assembly 30 to move relative to the mount 10 and the lifting mechanism 20 in the first direction A.

The rotating assembly 30 includes a retaining element 31, a rotating element 35 rotatably engaging the retaining element 31 and a shaft 37. In this exemplary embodiment, the retaining element 31 is positioned on the first mounting board 23 and the rotating element 35 is positioned on the horizontal driving device 50. The shaft 37 is affixed to the rotating element 35 and rotatably engages with the retaining element 31 so the rotating element 35 can rotate around the shaft 37 in a plane parallel to the plane of the retaining element 31. In this exemplary embodiment, the shaft 37 protrudes from the rotating element 35 and extends into a shaft hole 311 defined in the retaining element 31, and the shaft 37 is slightly smaller than the shaft hole 311 so the shaft 37 can rotate in the shaft hole 311. A distal end 371 of the shaft 37 is wider than the shaft hole 311 for preventing the shaft 37 from entering through the shaft hole 311 thereby retaining the rotating element 35 to the retaining element 31. As the rotating element 35 rotates relative to the retaining element 31, the shaft 37/shaft hole 311 combination prevent separation of the rotating element 35 and the retaining element 31.

Figure 3:
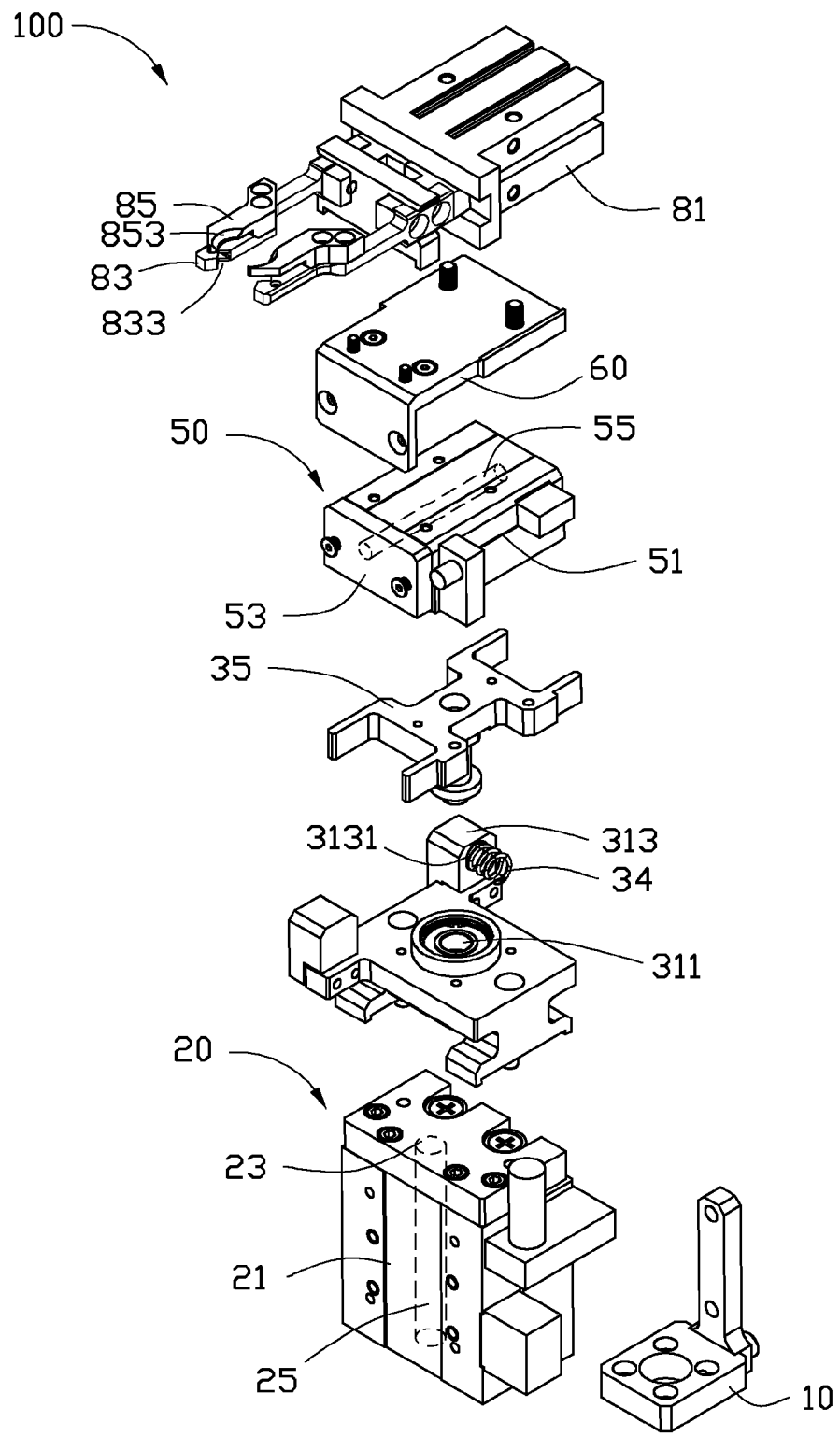
FIG. 3 is another exploded view of the robotic arm shown in FIG. 1.

Referring to FIGS. 2 and 3, the robotic arm 100 further includes a biasing member 34 coupled between the retaining element 31 and the rotating element 35. The biasing member 34 can exert a force on the rotating element 35 causing the rotating element 35 to rotate about the shaft 37 relative to the retaining element 31 to return to an original orientation. The biasing member 34 may be an elastic biasing member (such as an expansion spring, a compression spring, or an elastic band). One biasing member 34 is shown in this embodiment. However it is understood that a number of biasing members 34 may be used. In this embodiment, the biasing member 34 is located between a resisting block 313 protruding from the retaining element 31 toward the rotating element 35 and the rotating element 35. The resisting block 313 further defines a retaining hole 3131 for accommodating one end of the biasing member 34.

The horizontal driving device 50 includes a second cylinder assembly 51 mounted to the rotating element 35, a second output rod 55 movably mounted on the second cylinder assembly 51 and a second mounting board 53 mounted on a distal end of the second output rod 55. The second mounting board 53 is used for retaining the connecting board 60 to the horizontal driving device 50 so when the second mounting board 53 moves relative to the second cylinder assembly 51 along the second output rod 55, the second mounting board 53 drives the connecting board 60 to move relative to the mount 10 and the horizontal driving device 50 in the second direction B. The connecting board 60 is substantially L-shaped, one end of the connecting board 60 is retained to the second mounting board 53 and another end of the connecting board 60 is retained to the holder 80.

Referring to FIGS. 2 and 3, the holder 80 includes a holder controlling cylinder 81 mounted to the horizontal driving device 50 by the connecting board 60, two opposite main jaws 83 and two opposite secondary jaws 85. The main jaws 83 are located at one end of the holder controlling cylinder 81. The main jaws 83 can close to or separate from each other by the holder controlling cylinder 81, to hold or release the molding item. Each main jaw 83 defines a V-shaped clasping groove 833 facing the other main jaw 83, for firmly holding the molding item on the holder 80. Each secondary jaw 85 is positioned on one of the main jaws 83. The secondary jaws 85 can close or open under control of the holder controlling cylinder 81, to assist the main jaws 83 to hold the molding item. The distance between the secondary jaws 85 is smaller than the distance between the main jaws 83 so the secondary jaws 85 correspondingly contact or release the molding item before the main jaws 83 do. Each secondary jaw 85 defines a holding groove 853 aligned with corresponding clasping groove 833, for firmly holding the molding item on the holder 80.

Referring to FIG. 1, in use, to adjust the distance between the holder 80 and the molding machine in the first direction A, the first cylinder assembly 21 is started to drive the first mounting board 23 to move relative to the first cylinder assembly 21 until the holder 80 moves to a predetermined position. To adjust the distance between the holder 80 and the molding machine in the second direction B, the second cylinder assembly 51 is started to drive the second mounting board 53 to move relative to the second cylinder assembly 51 until the holder 80 moves to another predetermined position. Additionally, as the holder 80 comes into contact with the molded item, if the alignment is not correct, the contact will cause the holder 80 to rotate into alignment thus causing the rotating element 35 to rotate relative to the retaining element 31 and compress the biasing element 34. Once the holder 80 retracts with or without the molded item the biasing element 34 restores causing the holder 80 to rotate back to its original orientation.

It is to be understood that the horizontal driving device 50 and connecting board 60 can be omitted if the holder 80 do not need move relative to the mount 10 in the second direction B, and in this case, the holder 80 is directly mounted to the rotating assembly 30 so the holder 80 can rotate relative to the mount 10 by the rotating assembly 30 in the third direction C.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A robotic arm for holding a molding item, the robotic arm comprising:
    a mount;
    a lifting mechanism mounted to the mount;
    a horizontal driving device;
    a rotating assembly mounted between the lifting mechanism and the horizontal driving device to rotate the horizontal driving device relative to the lifting mechanism;
    a holder mounted on the horizontal driving device for holding the molding item, the holder including a holder controlling cylinder mounted to the horizontal driving device, two opposite main jaws located at one end of the holder controlling cylinder, and two opposite secondary jaws, each secondary jaw connected to one of the main jaws, thereby forming a pair of opposite jaw sets, for causing the main and secondary jaw of each jaw set to simultaneously move in the same direction; the holder controlling cylinder causing the jaw sets to move towards, or separate from, each other to hold or release the molding item, wherein each main jaw defines a V-shaped clasping groove facing the other main jaw, for firmly holding the molding item on the holder, each secondary jaw is mounted on one of the main jaws, the distance between the secondary jaws is smaller than the distance between the main jaws so the secondary jaws hold the molding item before the main jaws hold the molding item;
    wherein the lifting mechanism causes the holder to move relative to the mount in a first direction, the horizontal driving device moves the holder relative to the mount and the lifting mechanism in a second direction perpendicular to the first direction.

2. The robotic arm of claim 1, wherein each secondary jaw defines a holding groove aligned with corresponding clasping groove, for firmly holding the molding item on the holder.

\* \* \* \* \*